United States Patent [19]
Irie

[11] Patent Number: 6,084,506
[45] Date of Patent: Jul. 4, 2000

[54] DISPLAY APPARATUS FOR A BICYCLE

[75] Inventor: Yoshinori Irie, Osakasayama, Japan

[73] Assignee: Shimano, Inc., Osaka, Japan

[21] Appl. No.: 09/013,684

[22] Filed: Jan. 26, 1998

[30] Foreign Application Priority Data

Jan. 31, 1997 [JP] Japan ................................. 9-033237

[51] Int. Cl.[7] ............................. B65J 3/00; G06F 13/14
[52] U.S. Cl. ......................... 340/432; 345/326; 345/339
[58] Field of Search .................................. 345/339, 970,
345/326, 334; 340/432, 456

[56] References Cited

U.S. PATENT DOCUMENTS

| | | | |
|---|---|---|---|
| 4,490,127 | 12/1984 | Matsumoto et al. | 474/110 |
| 4,859,984 | 8/1989 | Romano | 340/432 |
| 5,621,382 | 4/1997 | Yamamoto | 340/432 |
| 5,625,336 | 4/1997 | Yamamoto | 340/432 |
| 5,676,021 | 10/1997 | Campagnolo | 74/489 |

*Primary Examiner*—Raymond J. Bayerl
*Assistant Examiner*—David E. Brown
*Attorney, Agent, or Firm*—James A. Deland

[57] ABSTRACT

A display apparatus for a bicycle includes a display for displaying a plurality of graphic elements in a series extending in a selected direction. Each of the plurality of graphic elements corresponds to a gear step of a gear changing device, and a size of each graphic element successively varies in the selected direction.

29 Claims, 5 Drawing Sheets

DISPLAY APPARATUS FOR A BICYCLE

BACKGROUND OF THE INVENTION

The present invention is directed to a bicycle display device for displaying bicycle speed, distance traveled, and various other types of data, and for allowing the rider to easily identify the gear into which the bicycle has been shifted.

Bicycles are often provided with display devices for displaying various types of data such as bicycle speed, distance traveled, the shift position of the change gear devices, and other such data. The display device usually presents the information in a digital format. However, with a conventional digital display of shift position it is difficult to ascertain the current shift position out of the total number of gears available, and the decision as to whether the gear is on the top or low side is not intuitive. That is because the shift position is not presented in an easily identifiable graphic form, and there is no clear indication as to how many gears are in the change gear devices of the bicycle.

SUMMARY OF THE INVENTION

The present invention is directed to a bicycle display device that displays the number of gears of the bicycle in an easily identifiable form, and that displays the shift position of the change gear devices in an intuitive and easily understood manner. In one embodiment of the present invention, a display apparatus for a bicycle includes a display for displaying a plurality of graphic elements in a series extending in a selected direction. Each of the plurality of graphic elements corresponds to a gear step of a gear changing device, and a size of each graphic element successively varies in the selected direction. In a more specific embodiment, a size of each of the plurality of graphic elements changes in a left to right direction, and the display activates only one of the plurality of graphic elements at a time to indicate a currently selected gear.

If the gear changing device includes a front gear changing device (such as a front derailleur) and a rear gear changing device (such as a rear derailleur), then the plurality of graphic elements may include a plurality of first graphic elements and a plurality of second graphic elements, wherein the plurality of first graphic elements correspond to the front gear changing device, and the plurality of second graphic elements correspond to the rear gear changing device. The plurality of first graphic elements may be disposed forwardly of the plurality of second graphic elements to simulate the gears on the front and rear gear changing devices. In this case the size of each of the plurality of first graphic elements successively increases in the left to right direction to simulate a conventional front chainwheel configuration, and the size of each of the plurality of second graphic elements successively decreases in the left to right direction to simulate a conventional rear freewheel configuration. The display activates only one of the plurality of first graphic elements at a time to indicate the currently selected chainwheel, and the display activates only one of the plurality of second graphic elements at a time to indicate the currently selected freewheel sprocket. A gear step number input mechanism may be provided for inputting a number of gear steps in the gear changing device, wherein the display activates only a number of the plurality of graphic elements equal to the number of gear steps to simulate the specific gear changing device being used. Each of the plurality of first graphic elements and each of the plurality of second graphic elements may have an oval shape which vary in size to simulate the diameters of the sprockets in the gear cluster, thus making the display even more intuitive.

DETAILED DESCRIPTION OF THE EMBODIMENTS

Figure 1:
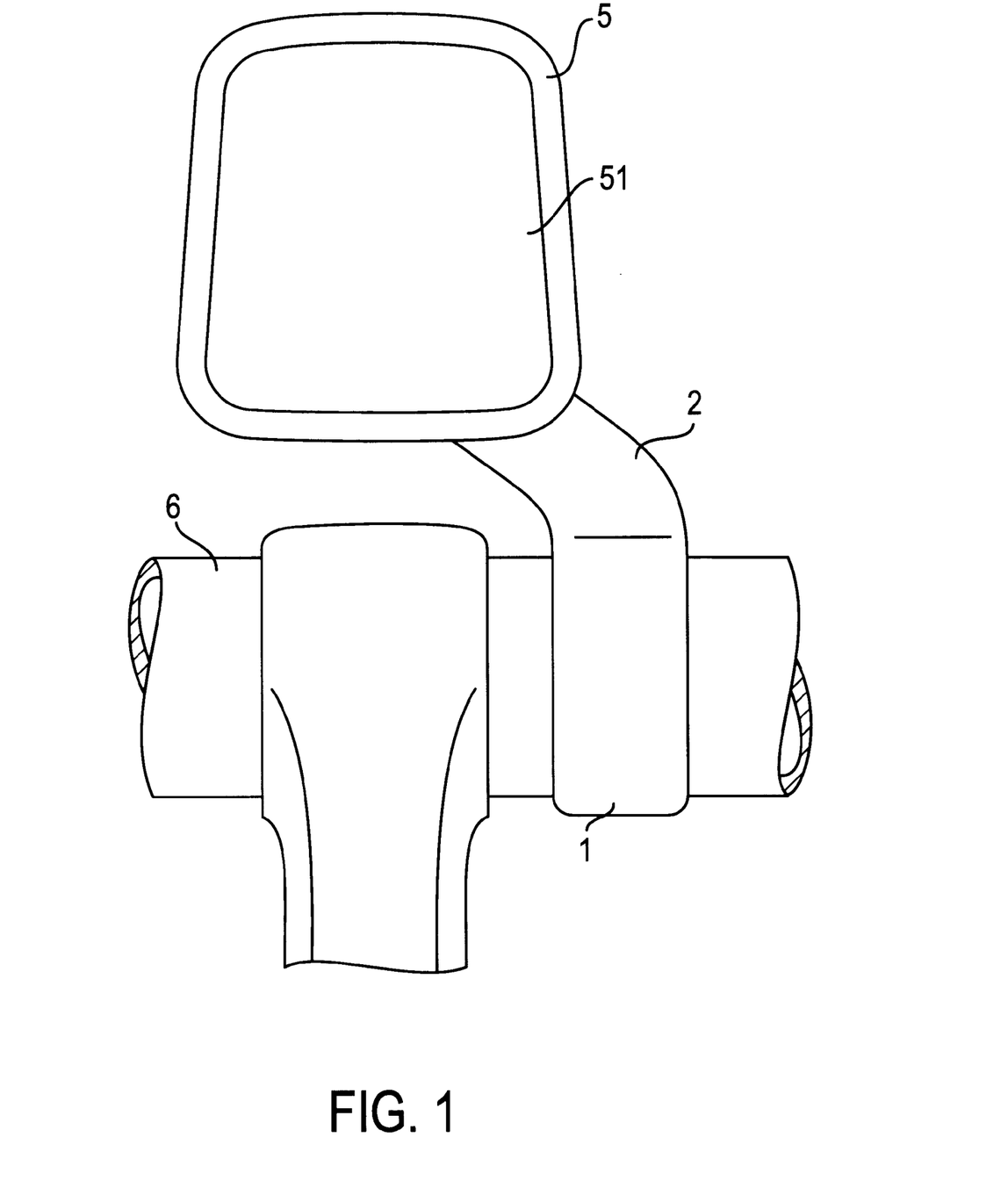
FIG. 1 is a front view of a particular embodiment of a bicycle display apparatus according to the present invention.

FIG. 1 is a front view of a particular embodiment of a bicycle display apparatus according to the present invention. As shown in FIG. 1, a display device 5 measures or computes and displays the bicycle speed, distance traveled, lap times, crank spindle revolutions, the shift position of the change gear devices, and other such data. A display screen 51 is positioned near the reference center plane of the bicycle, that is, in a place where it is easy for the rider to see it, such as in the center of the handlebar 6. The display screen 51 can comprise a liquid crystal display panel, a light emitting diode, or the like, but a liquid crystal display panel is preferable from the standpoint of electrical power consumption.

The attachment piece for attaching the display device 5 to the bicycle comprises an attachment component 1 for fixing the attachment piece to the desired position (such as the handlebar) and a support column 2 that is integrally fixed at one end (e.g., at its base) to the attachment component. The display device 5 is swivelably supported by a swivel shaft (not shown) at the distal end of the support column 2. The attachment component 1 is fixed to the handlebar 6 by a fastener comprising a bolt, nut, or the like. Since the support column 2 can be fixed to form any angle with the horizontal plane, the height of the display device 5 can be adjusted to any height within a specific range.

The support column 2 is provided at an angle with respect to the center axis of the attachment component 1, that is, to the plane perpendicular to the center axis of the handlebar 6, and the support column 2 extends from the attachment component 1 toward the reference center plane side of the bicycle. As a result, it is possible for the display screen 51 of the display device 5 to be positioned near the reference center plane of the bicycle. A swivel shaft (not shown), which is parallel to the center axis of the attachment component 1, is provided at the distal end side of the support column 2 for pivotably coupling the display device 5 to the support column 2.

Figure 2:
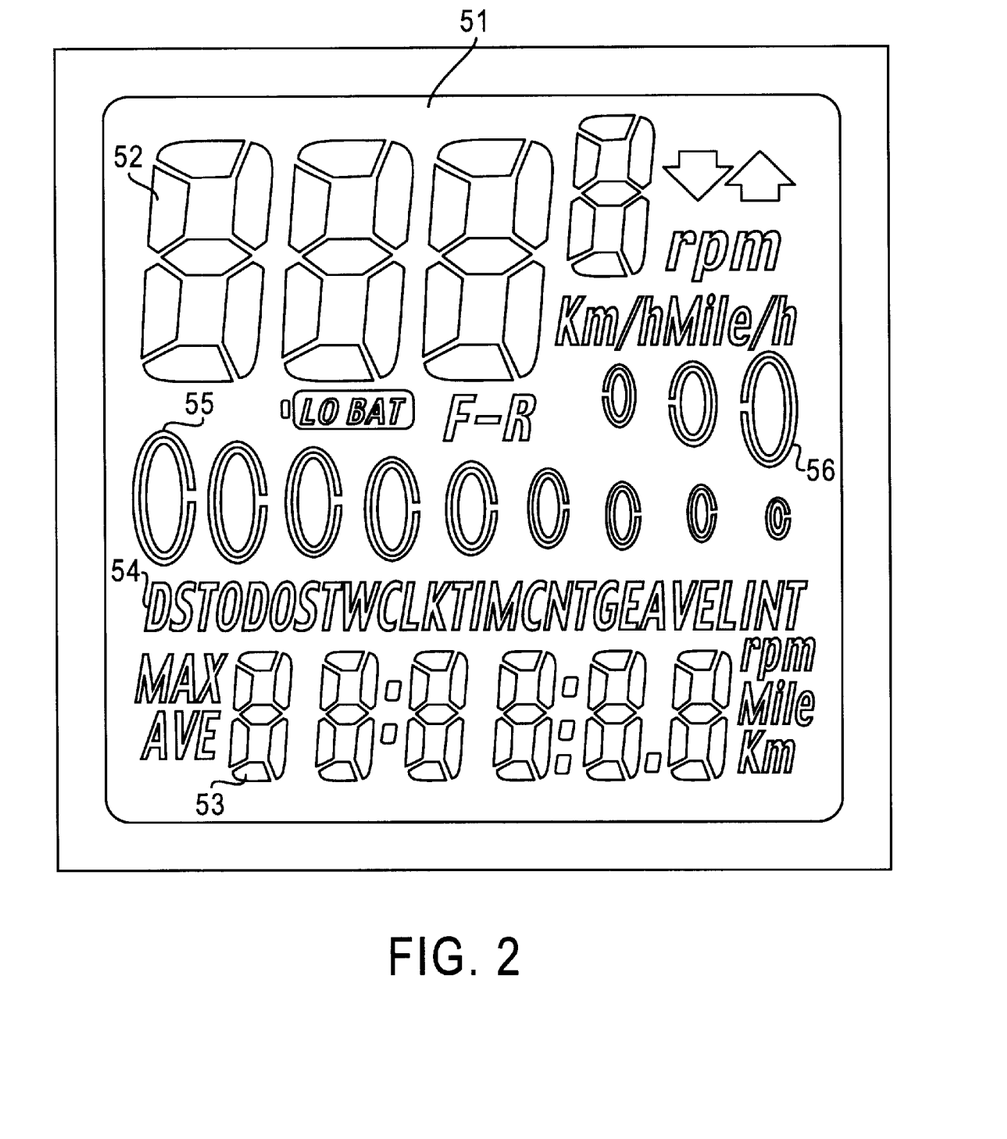
FIG. 2 is a detailed view of a particular embodiment of the graphic elements displayed in the display apparatus shown in FIG. 1.

FIG. 2 is a diagram of a particular embodiment of the graphic elements on the display screen 51 of the display device 5. The main digital display 52 and the secondary digital display 53 give digital displays of such data as the bicycle speed and the time. A designation display 54 gives the designations of the main digital display 52 and the secondary digital display 53. For example, "VEL" indicates the bicycle velocity, "DST" indicates traveled distance or cumulative distance, "CLK" indicates the clock time, "TIM" indicates the travel time, and "GEA" indicates the shift position of the change gear devices. The speed units can be switched from "Km/h" to "Mile/h", and the distance units can be switched from "Km" to "Mile." Once the distance units are set in the initial setting of the display device 5, the unit display for the display screen 51 will also be in the set units.

A rear gear number display 55 displays the gear number of the rear change gear device. The rear gear number display 55 comprises oval disk-shaped graphic elements that successively decrease in size and are aligned in a row from left to right. This arrangement corresponds to the effective diameters of the gears in the actual change gear device. In the initial setting of the display device 5, the number of gears in the front and rear change gear devices can be set so as to match the actual numbers of gears in the bicycle. For instance, if the rear gear number is set at five, the rear gear number display 55 will illuminate the five disk-shaped images from the left side, and the four on the right side will not be illuminated.

A front gear number display 56 displays the gear number of the front change gear device. The front gear number display 56 comprises oval disk-shaped graphic elements that successively decrease in size and are aligned in a row from right to left. If the front gear number is set at two in the initial setting, the front gear number display 56 will illuminate the two disk-shaped images on the right side, and the one on the left side will not be illuminated. Thus, the rear gear number display 55 and the front gear number display 56 are disposed such that the disk-shaped graphic elements are arranged by size corresponding to the gear arrangements of the actual change gear devices of the bicycle, so the gear number can be ascertained intuitively and at a glance.

The positional relationship between the graphic elements of the front gear number display 56 and the graphic elements of the rear gear number display 55 is such that the front gear number display 56 is positioned in front or on top, which lends an intuitive correspondence with the arrangement of the actual change gear devices. Also, if signals indicating the shift positions are picked up from the change gear devices, and if the disk-shaped images corresponding to the current shift positions of the change gear devices are made to flash the current shift position, then the rider can tell the shift position at a glance, and can also ascertain the relative position out of all the gear numbers.

Figure 3:
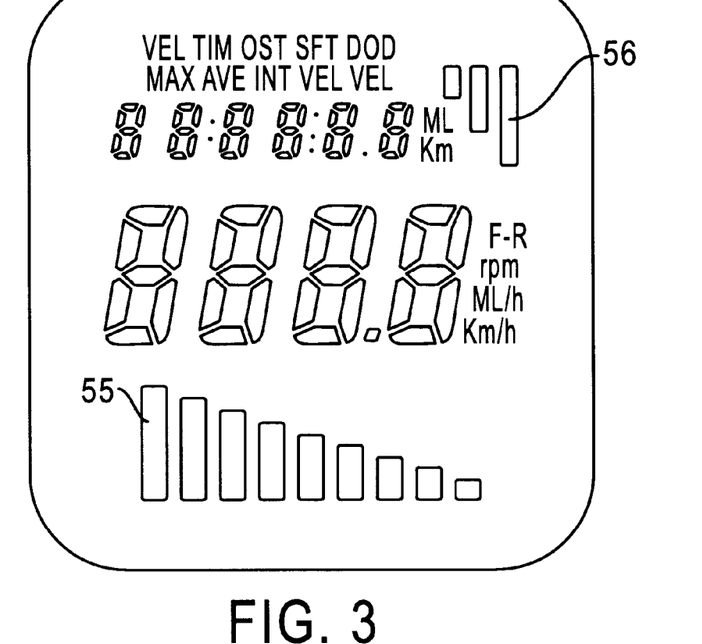
FIG. 3 is a detailed view of an alternative embodiment of the graphic elements displayed in the display apparatus shown in FIG. 1.

FIG. 3 is a diagram of another display configuration for the rear gear number display 55 and the front gear number display 56. Here, both gear number displays employ bar displays of successively varying length. The size arrangement of the bar displays among the rear gear number display 55 and the front gear number display 56, and the fore and aft arrangement of the rear gear number display 55 and the front gear number display 56 are the same as in FIG. 2, and thus they correspond to the arrangement of the actual change gear devices.

Figure 4:
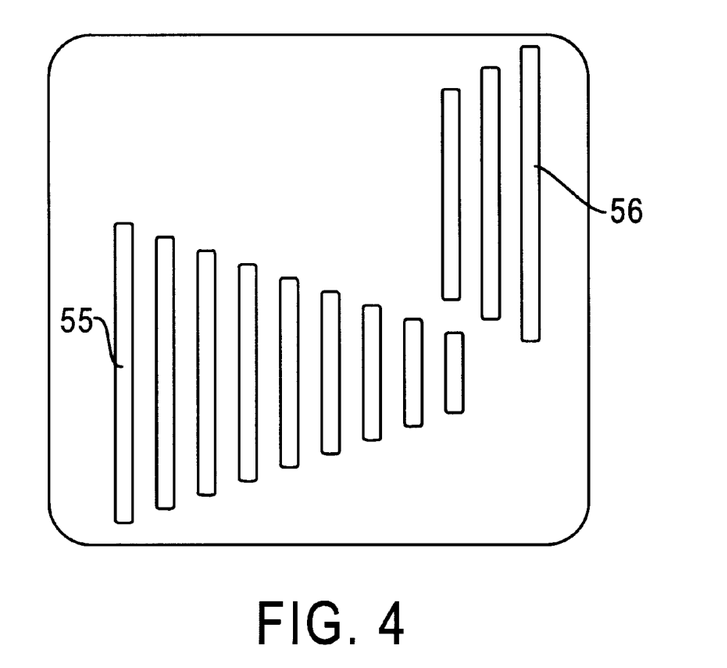
FIG. 4 is a detailed view of an alternative embodiment of the graphic elements that may be displayed in the display apparatus shown in FIG. 1.
Figure 5A:
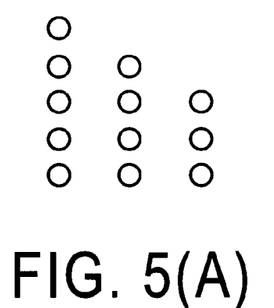
FIGS. 5(a)–5(e) are views showing alternative embodiments of graphic elements items that may be displayed in the display apparatus shown in FIG. 1.
Figure 5B:
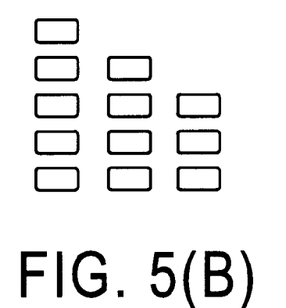
Figure 5C:
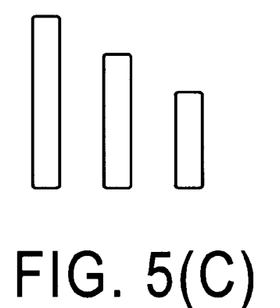
Figure 5D:
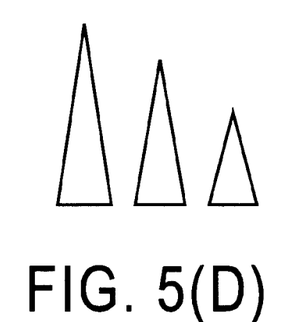
Figure 5E:
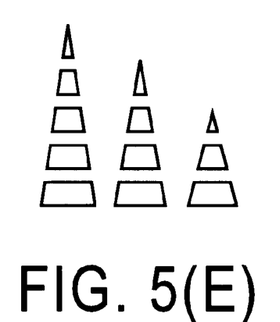

FIG. 4 is a diagram of another graphic element configuration for the rear gear number display 55 and the front gear number display 56. The graphic elements other than those of the rear gear number display 55 and the front gear number display 56 are the same as in FIG. 3, so they are not shown here. The rear gear number display 55 and the front gear number display 56 in FIG. 3 were bar displays that indicate the radius of the gears, but in FIG. 4 the bar displays represent the diameter of the gears, with the bars being in symmetry above and below a center axis.

FIGS. 5(a)–5(e) are diagrams of variations on the graphic elements of the rear gear number display 55 and the front gear number display 56. As shown in those figures, graphic elements of a variety of configurations can be used. Besides these, any shapes that successively vary in size in at least one direction can be used.

Figure 6:
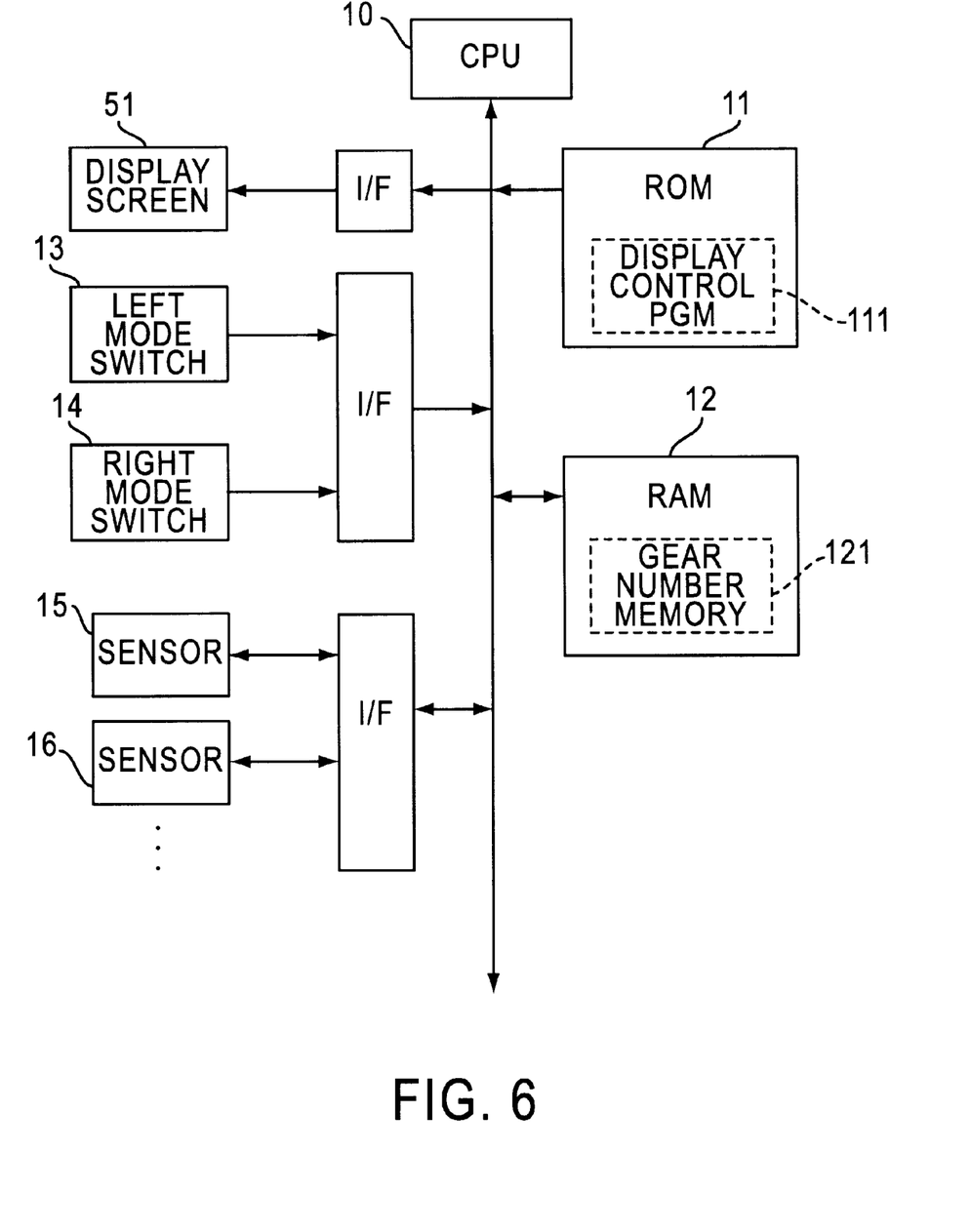
FIG. 6 is a block diagram of a particular embodiment of control circuitry which may be used to control the display shown in FIG. 1.

FIG. 6 is a block diagram of the circuit structure of the display device 5. A CPU 10 that processes data is provided to the display device 5. A ROM 11 and a RAM 12 are provided as memory means via buses to the CPU 10. Data and programs for operating the CPU 10 are stored in the ROM 11 and the RAM 12. Specifically, in the ROM 11 is stored a display control program 111 that controls the display of the display screen 51 of the display device 5. In the gear number memory 121 within the RAM 12 are stored the gear numbers of the front and rear change gear devices, which are set during the initial setting of the display device 5. Other initial setting values are also stored in specific regions of the RAM 12.

The CPU 10 is connected to the display screen 51 via a bus and an interface circuit, and the display of the display screen 51 is controlled by the CPU 10 and the display control program 111. The CPU 10 is also connected to a left hand mode switch 13 and a right hand mode switch 14 via a bus and an interface circuit, and the on/off state of these switches is sensed by the CPU 10. The CPU 10 is further connected to various sensors 15, 16, . . . for sensing the shift positions of the change gear devices, tire revolutions, crank spindle revolutions, and so on, via a bus and an interface circuit, and the outputs of these sensors 15, 16, . . . are processed by the CPU 10. The signal lines from the sensors 15, 16, . . . are connected to signal input terminals on the display device 5.

The connection terminals of the display device 5 are connected to the left hand mode switch 13 and the right hand mode switch 14 that are used to switch the graphic elements on the display screen 51 and to input initial setting values. The left hand mode switch 13 is provided to the attachment piece of the left brake lever, and the right hand mode switch 14 is provided to the attachment piece of the right brake lever. Thus, the display device 5 can be operated without taking the hands off the grip position of the handlebar by operating these two mode switches.

The display device 5 described above operates as follows. The first time a battery is installed in the display device 5, the main digital display 52 and the secondary digital display 53 are set so that they display speed and clock time. Pressing the left hand mode switch 13 a number of times here allows the display of the main digital display 52 to be successively switched to distance traveled, shift position digital display, maximum speed, average speed, and so on.

When the left hand mode switch 13 and the right hand mode switch 14 are pressed at the same time, the designation display 54 displays "INT," and the initial setting input mode is entered. Pressing the left hand mode switch 13 and successively switching the types of initial setting values allows the units of distance and speed to be switched from "Km" to "Mile," and the tire circumference setting, time setting, gear number setting for the front and rear change gear devices, and so on to be performed. The first switch is "Km" and "Mile," and since the predetermined "Km/h" and "Km" are flashing, the set units are made to flash by means of the right hand mode switch 14, and the left hand mode switch 13 is pressed to enter this setting and move on to the next setting mode.

Next is the setting of the tire circumference. The details of this setting will not be described here, but once the setting of tire circumference is completed, the setting of clock time comes next. The time is displayed on the secondary digital display 53, with the setting mode being switched between seconds, minutes, and hours (in that order) with the left hand mode switch 13, and the appropriate numerical values being entered with the right hand mode switch 14. When everything is set and the left hand mode switch 13 is pressed, the time setting is complete, and the procedure moves on to the setting of the number of gears in the front and rear change gear devices.

In the setting of the number of gears of the front and rear change gear devices, since the entire rear gear number display 55 is flashing at first, the right hand mode switch 14 is pressed a number of times to make the disk-shaped images flash in a number that matches the number of gears on the bicycle. Once the setting is finished, the left hand mode switch 13 is pressed to move on to the setting of the gear number for the front gear number display 56. The setting method is the same as for the rear gear number display 55. The set gear numbers are stored in the gear number memory 121, and the stored gear number data are preserved until new initial settings are entered.

Once all of the initial settings have been entered, the left hand mode switch 13 and the right hand mode switch 14 are again pushed at the same time, which puts the display device 5 in its normal display mode. Simultaneously holding down the left hand mode switch 13 and the right hand mode switch 14 for at least 3 seconds allows the display device 5 to be initialized and the CPU 10 to be reset.

Making the disk-shaped images flash according to the current shift positions of the rear gear number display 55 and the front gear number display 56 and thereby displaying the current shift positions is the function of the display control program 111. The display of the shift positions is not limited to flashing, and may instead be distinguished from other graphic elements by using a different color for this display from that used for the other disk-shaped images (if color display is possible), for example.

While the above is a description of some embodiments of the present invention, various modifications well within the skill of the art may be employed. For example, the function performed by one element may be performed by two elements, and vice versa. The size, shape, orientation, and number of components may be changed as desired.

In the case of external change gear devices, the size relationships of the graphic elements of the rear gear number display 55 and front gear number display 56 should correspond to the effective diameters of the gears, as discussed above, but in the case of a bicycle with internal change gear devices, the size relationships of the graphic elements of the rear gear number display 55 and front gear number display 56 should correspond to the gear ratios (upshift ratios or downshift ratios) of the change gear devices. The same merits will be obtained with a bicycle having internal change gear devices as with a bicycle having external change gear devices.

In the above embodiment, mode switches were not provided to the display device itself, and only remote mode switches were provided, but mode switches may also be provided to the display device itself, or mode switches may be installed only on the display device itself.

Thus, the invention should not be limited to the specific embodiments disclosed. Instead, the scope of the invention should be ascertained by the following claims.

What is claimed is:

1. A display apparatus for a bicycle comprising:
   a display for displaying a plurality of graphic elements in a series extending in a direction, wherein each of the plurality of graphic elements corresponds to a gear step of a gear changing device, wherein a size of each graphic element successively varies in the direction, and wherein a size of each of the plurality of graphic elements corresponds to a diameter of a corresponding sprocket in the gear change device.

2. The apparatus according to claim 1 wherein the display activates only one of the plurality of graphic elements at a time.

3. The apparatus according to claim 1 wherein a size of each of the plurality of graphic elements changes in a left to right direction.

4. The apparatus according to claim 3 wherein the size of each of the plurality of graphic elements successively increases in the left to right direction.

5. The apparatus according to claim 3 wherein the size of each of the plurality of graphic elements successively decreases in the left to right direction.

6. The apparatus according to claim 1 wherein the gear changing device includes a front gear changing device and a rear gear changing device, and wherein the plurality of graphic elements includes:
   a plurality of first graphic elements;
   a plurality of second graphic elements;
   wherein the plurality of first graphic elements correspond to the front gear changing device; and
   wherein the plurality of second graphic elements correspond to the rear gear changing device.

7. A display apparatus for a bicycle comprising:
   a display for displaying a plurality of graphic elements in a series extending in a direction, wherein each of the plurality of graphic elements corresponds to a gear step of a gear changing device, and wherein a size of each graphic element successively varies in the direction;
   wherein the gear changing device includes a front gear changing device and a rear gear changing device, and wherein the plurality of graphic elements includes:
   a plurality of first graphic elements;
   a plurality of second graphic elements;
   wherein the plurality of first graphic elements correspond to the front gear changing device; and
   wherein the plurality of second graphic elements correspond to the rear gear changing device;
   wherein a size of each of the plurality of first graphic elements changes in a left to right direction, and wherein a size of each of the plurality of second graphic elements changes in a left to right direction.

8. The apparatus according to claim 7 wherein the size of each of the plurality of first graphic elements successively increases in the left to right direction, and wherein the size of each of the plurality of second graphic elements successively decreases in the left to right direction.

9. The apparatus according to claim 8 wherein the plurality of first graphic elements are disposed forwardly of the plurality of second graphic elements.

10. The apparatus according to claim 9 wherein the display activates only one of the plurality of first graphic elements at a time, and wherein the display activates only one of the plurality of second graphic elements at a time.

11. The apparatus according to claim 10 wherein each of the plurality of first graphic elements and each of the plurality of second graphic elements have an oval shape.

12. The apparatus according to claim 1 further comprising a gear step number input mechanism for inputting a number of gear steps in the gear changing device, and wherein the display activates only a number of the plurality of graphic elements equal to the number of gear steps.

13. The apparatus according to claim 12 wherein the gear changing device includes a front gear changing device and a rear gear changing device, and wherein the plurality of graphic elements includes:
   a plurality of first graphic elements;
   a plurality of second graphic elements;
   wherein the plurality of first graphic elements correspond to the front gear changing device; and
   wherein the plurality of second graphic elements correspond to the rear gear changing device.

14. The apparatus according to claim 13 wherein a size of each of the plurality of first graphic elements changes in a left to right direction, and wherein a size of each of the plurality of second graphic elements changes in a left to right direction.

15. A display apparatus for a bicycle comprising:
   a display for displaying a plurality of graphic elements in a series extending in a direction, wherein each of the plurality of graphic elements corresponds to a gear step of a gear changing device, and wherein a size of each graphic element successively varies in the direction;
   a gear step number input mechanism for inputting a number of gear steps in the gear changing device;
   wherein the display activates only a number of the plurality of graphic elements equal to the number of gear steps;
   wherein the gear changing device includes a front gear changing device and a rear gear changing device, and wherein the plurality of graphic elements includes:
   a plurality of first graphic elements;
   a plurality of second graphic elements;
   wherein the plurality of first graphic elements correspond to the front gear changing device; and
   wherein the plurality of second graphic elements correspond to the rear gear changing device;
   wherein the size of each of the plurality of first graphic elements successively increases in the left to right direction, and wherein the size of each of the plurality of second graphic elements successively decreases in the left to right direction.

16. The apparatus according to claim 15 wherein the plurality of first graphic elements are disposed forwardly of the plurality of second graphic elements.

17. The apparatus according to claim 16 wherein the display activates only one of the plurality of first graphic elements at a time, and wherein the display activates only one of the plurality of second graphic elements at a time.

18. The apparatus according to claim 17 wherein each of the plurality of first graphic elements and each of the plurality of second graphic elements have an oval shape.

19. The apparatus according to claim 1 further comprising a signal input mechanism for inputting a signal indicating a gear step of the gear change device.

20. The apparatus according to claim 19 wherein the display activates the graphic elements corresponding to the indicated gear step.

21. The apparatus according to claim 20 wherein the gear changing device includes a front gear changing device and a rear gear changing device, and wherein the plurality of graphic elements includes:
   a plurality of first graphic elements;
   a plurality of second graphic elements;
   wherein the plurality of first graphic elements correspond to the front gear changing device; and
   wherein the plurality of second graphic elements correspond to the rear gear changing device.

22. The apparatus according to claim 21 wherein a size of each of the plurality of first graphic elements changes in a left to right direction, and wherein a size of each of the plurality of second graphic elements changes in a left to right direction.

23. A display apparatus for a bicycle comprising:
   a display for displaying a plurality of graphic elements in a series extending in a direction, wherein each of the plurality of graphic elements corresponds to a gear step of a gear changing device, and wherein a size of each graphic element successively varies in the direction;
   a signal input mechanism for inputting a signal indicating a gear step of the gear change device;
   wherein the display activates the graphic elements corresponding to the indicated gear step;
   wherein the gear changing device includes a front gear changing device and a rear gear changing device, and wherein the plurality of graphic elements includes:
   a plurality of first graphic elements;
   a plurality of second graphic elements;
   wherein the plurality of first graphic elements correspond to the front gear changing device; and
   wherein the plurality of second graphic elements correspond to the rear gear changing device;
   wherein the size of each of the plurality of first graphic elements successively increases in the left to right direction, and wherein the size of each of the plurality of second graphic elements successively decreases in the left to right direction.

24. The apparatus according to claim 23 wherein the plurality of first graphic elements are disposed forwardly of the plurality of second graphic elements.

25. The apparatus according to claim 24 wherein the display activates only one of the plurality of first graphic elements at a time, and wherein the display activates only one of the plurality of second graphic elements at a time.

26. The apparatus according to claim 25 wherein each of the plurality of first graphic elements and each of the plurality of second graphic elements have an oval shape.

27. The apparatus according to claim 1 wherein a height of each graphic element successively varies in the direction.

28. A display apparatus for a bicycle comprising:
   a display for displaying a plurality of graphic elements in a series extending in a direction, wherein each of the plurality of graphic elements corresponds to a gear step of a gear changing device;
   wherein the gear changing device includes a front gear changing device and a rear gear changing device, and wherein the plurality of graphic elements includes:
   a plurality of first graphic elements;
   a plurality of second graphic elements;
   wherein the plurality of first graphic elements correspond to the front gear changing device; and
   wherein the plurality of second graphic elements correspond to the rear gear changing device;
   wherein the size of each of the plurality of first graphic elements successively increases in the left to right direction, and wherein the size of each of the plurality of second graphic elements successively decreases in the left to right direction.

29. A display apparatus for a bicycle comprising:

a display for displaying a plurality of graphic elements in a series extending in a direction, wherein each of the plurality of graphic elements corresponds to a gear step of a gear changing device, and wherein a size of each graphic element successively varies in the direction;

a gear step number input mechanism for inputting a number of gear steps in the gear changing device; and wherein the display activates only a number of the plurality of graphic elements equal to the number of gear steps.

* * * * *